United States Patent [19]

Bouchez et al.

[11] Patent Number: 6,009,703

[45] Date of Patent: Jan. 4, 2000

[54] PROCESS AND ASSEMBLY FOR ELIMINATING NITROGEN OXIDES PRESENT IN EXHAUST GAS, USING A HEAT EXCHANGER

[75] Inventors: Matthias Bouchez, Meudon; Brigitte Martin, Saint Genis Laval, both of France

[73] Assignee: Institut Francais du Petrole, Rueil-Malmaison, France

[21] Appl. No.: 09/094,633

[22] Filed: Jun. 15, 1998

[30] Foreign Application Priority Data

Jun. 16, 1997 [FR] France ................................ 97 07555

[51] Int. Cl.⁷ ........................................................ F01N 3/00
[52] U.S. Cl. ............................... 60/274; 60/287; 60/298; 60/301; 60/320
[58] Field of Search ............................ 60/298, 301, 286, 60/287, 320, 274

[56] References Cited

U.S. PATENT DOCUMENTS

| | | | |
|---|---|---|---|
| 3,716,344 | 2/1973 | Ashburn . | |
| 4,023,360 | 5/1977 | Wossner et al. | 60/286 |
| 4,817,385 | 4/1989 | Kumagai | 60/288 |
| 5,085,050 | 2/1992 | Katoh | 60/288 |
| 5,201,802 | 4/1993 | Hirota et al. . | |
| 5,855,113 | 1/1999 | Cullen et al. | 60/274 |

FOREIGN PATENT DOCUMENTS

| | | |
|---|---|---|
| 3439998 | 9/1985 | Germany . |
| 4410022 | 10/1995 | Germany . |
| 1159061 | 7/1969 | United Kingdom . |

OTHER PUBLICATIONS

Patent Abstracts of Japan, vol. 017, No. 346 (M–1437) Jun. 30, 1993, & JP 05 044454 A (Mitsubishi Heavy Ind. Ltd.) Feb. 23, 1993.

*Primary Examiner*—Thomas E. Denion
*Attorney, Agent, or Firm*—Antonelli, Terry, Stout & Kraus, LLP

[57] ABSTRACT

The present invention relates to a process and to an assembly for eliminating nitrogen oxides present in the exhaust gas of an internal-combustion engine (1), said assembly being part of the exhaust line (2) coming from the engine and comprising:
- a nitrogen oxides conversion means,
- a heat exchanger (4) placed in a bypass line (5) situated upstream from conversion means (3), intended to cool said exhaust gas.

According to the invention, the conversion means comprises several catalysts (3) placed in main exhaust line (2), said catalyst(s) having non-coinciding temperature ranges for which conversion of the nitrogen oxides is below a certain threshold ($C_{min}$). Furthermore, at least one valve (6) is placed at the inlet of bypass line (5) and intended to modulate the flow of gas between said bypass line (5) and main line (2) so that said exhaust gas reaches catalysts (3) at a temperature where at least one of said catalysts is active.

11 Claims, 1 Drawing Sheet

PROCESS AND ASSEMBLY FOR ELIMINATING NITROGEN OXIDES PRESENT IN EXHAUST GAS, USING A HEAT EXCHANGER

FIELD OF THE INVENTION

The present invention relates to the processing of gas discharged at the exhaust of internal-combustion engines and more specifically of lean-burn diesel and spark-ignition engines.

Such engines emit a certain number of pollutants that have to be eliminated, which must be done all the more effectively because standards become increasingly stringent.

Examples of the most numerous pollutants which have the most harmful effects on the environment are nitrogen oxides.

BACKGROUND OF THE INVENTION

It is well-known to eliminate this type of pollutants by passing the exhaust gas through catalysts (referred to as $DeNO_x$ catalysts) intended for nitrogen oxides conversion. The known catalysts being active within a given temperature range, several catalysts having different formulations, i.e. different activity ranges, may be placed in the catalytic muffler. The sphere of action of the catalytic elements is thus extended. However, in this context, a problem comes up when the exhaust gas is not, at the level of the catalyst(s), within a temperature range for which conversion of the nitrogen oxides is sufficient.

More precisely, a problem comes up when a first catalyst is active in a first temperature range and a second catalyst is active in a second temperature range, and when these ranges are such that there is a range of temperatures between and above the two temperature ranges defined above in which the nitrogen oxides conversion will be low.

By way of illustration, the formulations used for low temperatures are of the Platinum/Alumina or Platinum/Zeolite type. The temperatures for which these catalysts are the most active are from 200° C. to 250° C.

Catalysts referred to as "High-temperature" catalysts are generally active between 300° C. and 500° C. These are for example Copper/Zeolite type catalysts.

It is of course obvious that, between these two ranges, i.e. here between 250° C. and 300° C., no nitrogen oxides conversion can be performed effectively. Below 200° C. and above 500° C., the problem is the same.

The present invention allows this type of problem to be solved.

Generally speaking, the present invention can be implemented when an exhaust line comprises such catalysts that there are temperature ranges for which $NO_x$ conversion is not sufficient.

Also known are exhaust lines such as those described for example in document DE-4,414,904, comprising a heat exchanger by means of which all the exhaust gases can be heated or cooled, as the case may be, in order to optimize conversion and to limit catalyst aging.

Document DE-4,410,022 describes an exhaust line also comprising an exchanger mounted in series, upstream from the catalyst, in order to control the catalyst temperature.

U.S. Pat. No. 3,716,344 describes a conversion catalyst provided with fins and means situated upstream in order to cool it if need be.

These known technological solutions allow to control the temperature of the gas reaching the catalyst so that the latter can effectively convert it and aging of the catalyst can be limited.

However, this type of solution does not allow fine modulation of the temperature of the gas since, in such systems, the exhaust gas flows through a heat exchanger prior to passing through the catalyst.

The present invention notably meets the problem linked with the absence of conversion for certain exhaust gas temperature ranges in which none of the catalysts is active.

An original way of solving this problem is presented hereafter.

SUMMARY OF THE INVENTION

The object of the present invention is thus an assembly for eliminating nitrogen oxides present in the exhaust gas of an internal-combustion engine, said assembly being part of the exhaust line coming from the engine and comprising:

a nitrogen oxides conversion means, a heat exchanger placed in a bypass line situated upstream from the conversion means and intended to cool said exhaust gas.

According to the invention, said conversion means comprises several catalysts placed in the main exhaust line, said catalyst(s) having non-coinciding temperature ranges for which conversion of the nitrogen oxides is below a certain threshold ($C_{min}$). Furthermore, at least one valve is placed at the inlet of the bypass line in order to modulate the flow of gas between said bypass line and the main line, so that said exhaust gas reaches the catalysts at a temperature where at least one of said catalysts is active.

Furthermore, the assembly according to the invention can comprise a computing and control means intended to control notably said flow regulation valve.

Besides, the assembly according to the invention also comprises at least a first temperature sensor placed at the outlet of the bypass line, upstream from said conversion catalyst(s), said sensor transmitting the measurements to the computing and control means.

In particular, the assembly according to the invention also comprises a hydrocarbon injection means placed upstream from the nitrogen oxides conversion catalyst(s), said means being connected to and controlled by the computing and control means.

The object of the invention is also a process for eliminating nitrogen oxides present in the exhaust gas of an internal-combustion engine, consisting in performing catalytic conversion of the nitrogen oxides and in cooling at least part of the gas prior to the conversion thereof by means of a heat exchanger placed in a line bypassing the main line, upstream from the catalytic conversion.

According to the invention, conversion can be performed in at least two non-coinciding temperature ranges and cooling of the gas is controlled so that it occurs only when the catalytic conversion coefficient is below a predetermined value ($C_{min}$), in order that the conversion can be performed in one of the temperature ranges where at least one of the conversion means is active.

The process according to the invention thus allows to increase the efficiency of the $DeNO_x$ catalyst(s) by means of a fine management of the exhaust gas temperature.

The temperature of the gas is preferably measured at the outlet of the bypass line, upstream from the catalyst.

Furthermore, cooling is controlled as a function of said temperature of the gas measured at the outlet of the bypass line.

Hydrocarbons are advantageously injected upstream from the catalytic conversion and said injection is controlled as a function of the temperature of the gas at the outlet of the bypass line.

Without departing from the scope of the invention, cooling can be controlled as a function of other parameters linked with the running of the engine, such as for example the temperature of the gas at the engine outlet, the flow of gas, the engine torque.

The invention will be preferably but not exclusively used in lean-burn diesel or spark-ignition engines.

BRIEF DESCRIPTION OF THE DRAWINGS

Other features, advantages and details of the invention will be clear from reading the description hereafter, given by way of non limitative example, with reference to the accompanying drawings wherein.

DETAILED DESCRIPTION OF THE INVENTION

Figure 1:
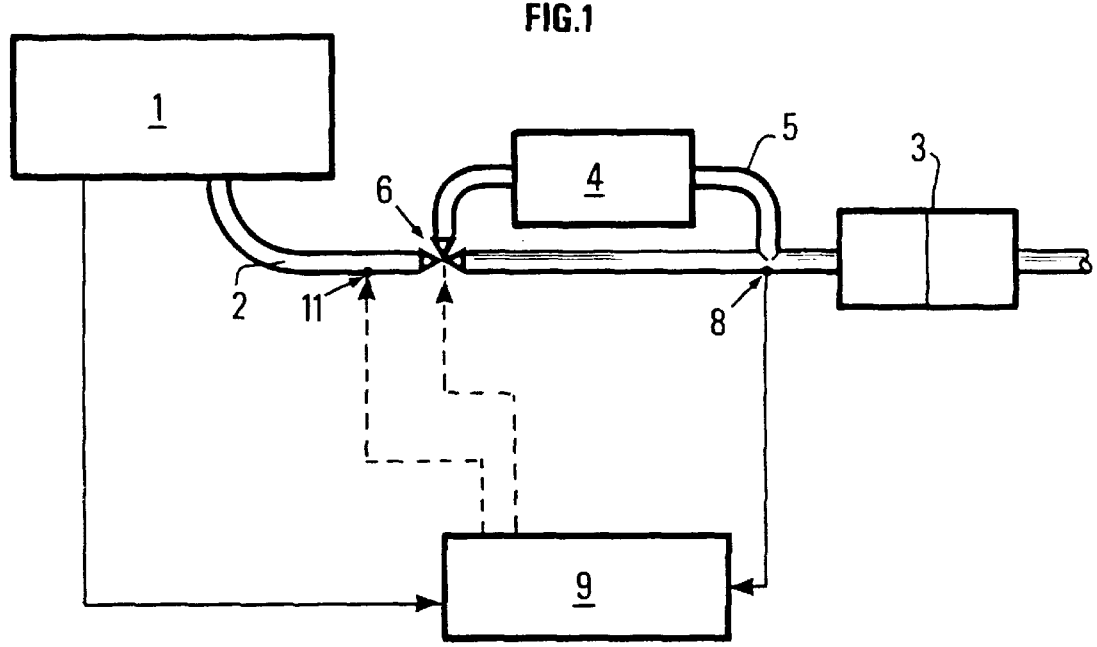
FIG. 1 is a diagram showing the main elements of the invention.

FIG. 1 illustrates the main structural elements forming the nitrogen oxides elimination assembly according to the invention.

An engine 1 is schematized with its main exhaust line 2, in which the invention is implemented.

A lean-burn diesel or spark-ignition engine is highly appropriate because nitrogen oxides reduction in an oxidizing environment is difficult.

As it is known in the art, one or more nitrogen oxides conversion catalysts 3, commonly referred to as DeNO$_x$ catalysts, are placed on exhaust line 2. According to the formulation thereof, each catalyst acts for a specific exhaust gas temperature range.

According to the invention, at least one line 5 bypassing main exhaust line 2 is provided, and at least one heat exchanger 4 is placed in line 5.

Bypass line 5 opens into main line 2 just upstream from DeNO$_x$ catalysts 3.

Furthermore, a throttling means 6 is provided at the intersection of main line 2 and bypass line 5, on the upstream side. Valve 6 is intended to modulate the flow of gas between main line 2 which opens into DeNO$_x$ catalyst(s) 3 and bypass line equipped with exchanger 4.

Means 4 can allow cooling of the gas flowing into bypass line 5 when the temperature of the gas at the inlet of the DeNO$_x$ catalyst(s) is such that the latter is not active enough, i.e. below a certain conversion threshold C$_{min}$. Cooling of the exhaust gas then allows to return to a zone where conversion is above C$_{min}$ as explained in detail hereafter.

Furthermore, at least a first temperature sensor 8 can be mounted on main exhaust line 2.

Said sensor 8 is preferably placed upstream from conversion catalyst(s) 3.

It is connected to a control and/or computing means such as a microprocessor 9.

By means of the information received and of stored values, computer 9 reacts on several elements. The arrowed solid lines in FIG. 1 represent the information received by computer 9. It may be noted that said computer 9 also uses data linked with the running of engine 1, such as speed, pressures, . . .

The dotted lines in FIG. 1 represent the control actions of computer 9 on certain elements. Computer 9 thus acts on flow regulation valve 6 between main line 2 and bypass line 5.

Without departing from the scope of the present invention, the computer can control a means 11 intended to inject a certain amount of hydrocarbons in main line 2.

Figure 2:
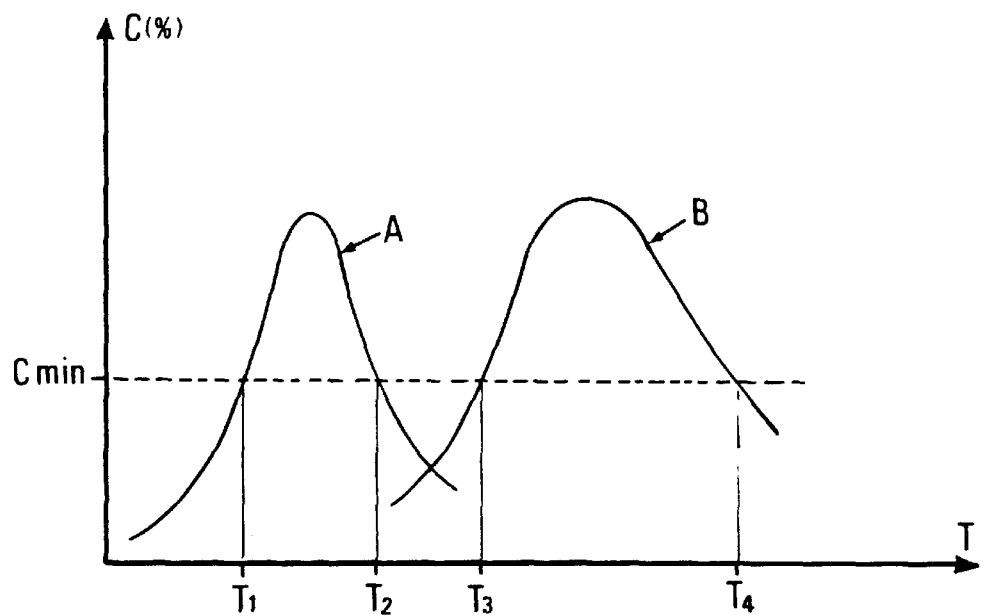
FIG. 2 is a curve giving the conversion coefficient of DeNO$_x$ catalyst(s) as a function of the exhaust gas temperature measured upstream.

Operation of the assembly described above is explained hereunder in connection with FIG. 2.

In the graph of FIG. 2, the NO$_x$ conversion coefficient (C) of the catalyst(s) such as 3 is given as a function of the temperature (T) of the gas taken just upstream from said catalyst(s) 3.

According to this example, two catalysts of different formulation are used: one gives curve A, i.e. it is really active between T$_1$ and T$_2$. It is a catalyst whose formulation allows to react at low temperatures.

The second catalyst reacts according to curve B, i.e. for gases whose temperatures range between T$_3$ and T$_4$, T$_3$ being greater than T$_2$.

The values T$_1$, T$_2$, T$_3$ and T$_4$ correspond to a minimum conversion coefficient C$_{min}$.

When the temperature level of the exhaust gas flowing through catalytic muffler 3 is in a T$_2$, T$_3$ range or when it is above T$_4$, all or part of the exhaust gas passes through heat exchanger 4 in order to decrease the temperature of the gas flowing through the catalyst. The gas fraction which is diverted to exchanger 4 is defined so as to obtain a mixture temperature of the two flows situated in the neighbourhood of the maximum conversion temperature of one of the formulations.

Computer 9, which permanently receives the temperature of the gas at the level of catalyst(s) 3, allows to actuate valve 6 accordingly.

Furthermore, the efficiency of the NO$_x$ reduction on DeNO$_x$ catalyst 3 depends on certain parameters such as the temperature, the GHSV (ratio of the volume flow rate of gas flowing through the catalyst to the volume of catalyst), the HC/NO$_x$ ratio. If the amount of unburned hydrocarbons resulting from the combustion of the engine is not sufficient, an additional hydrocarbon injection can be performed so as to have optimum NO$_x$ reduction conditions. Means 11, controlled by computer 9, allows this type of injection.

In an internal-combustion engine, several injection zones can be considered without departing from the scope of the present invention:

upstream from the intake valve, so that all or part of the hydrocarbons injected gets to the exhaust in the form of unburned hydrocarbons, in the combustion chamber, before or after the main injection, so that all or part of these hydrocarbons gets to the exhaust in the form of unburned hydrocarbons, in the exhaust line upstream from the DeNO$_x$ catalyst as illustrated in FIG. 1.

The invention will be preferably but not exclusively used in lean-burn diesel or spark-ignition engines.

We claim:

1. An assembly for elimination of nitrogen oxides present in the exhaust gas of an internal-combustion engine, said assembly being part of an exhaust line coming from the engine and comprising:

a nitrogen oxides conversion means, a heat exchanger for cooling said exhaust gas placed in a bypass line, said bypass line having an outlet into said exhaust line situated upstream from said conversion means and an inlet from said exhaust line upstream from said outlet, characterized in that said conversion means comprises several catalysts placed in said exhaust line, said catalysts having non-coinciding temperature ranges for which nitrogen oxides conversion is below a certain threshold ($C_{min}$), and in that at least one valve is placed at the inlet of said bypass line in order to modulate the flow of gas between said bypass line and said exhaust line, so that said exhaust gas reaches said catalysts at a temperature where at least one of said catalysts is active.

2. An assembly as claimed in claim 1, further comprising a computing and control means (9) to control said valve (6).

3. An assembly as claimed in claim 2, further comprising at least a first temperature sensor (8) placed at the outlet of bypass line (5), upstream from said conversion catalyst(s) (3), said sensor (8) transmitting measurements to said computing and control means (9).

4. An assembly as claimed in claim 2, further comprising a hydrocarbon injection means (11) placed upstream from said catalyst(s), said injection means being connected to and controlled by said computing and control means (9).

5. A process for eliminating nitrogen oxides present in the exhaust gas of an internal-combustion engine, comprising performing catalytic conversion of the nitrogen oxides and in cooling at least part of the gas prior to the conversion thereof by means of a heat exchanger placed in a bypass line bypassing main line, the bypass line delivering cooled gas back into the main line upstream from the catalytic conversion, characterized in that conversion, downstream of the bypass line, is performed in at least two non-coinciding temperature ranges and in that cooling of the gas is controlled so that it occurs only when the catalytic conversion coefficient is below a predetermined value (Cmin) in order that conversion can occur in one of the temperature ranges where at least one of the conversion means is active.

6. A process as claimed in claim 5, characterized in that the temperature of the gas is measured at the outlet of the bypass line, upstream from the catalytic conversion.

7. A process as claimed in claim 6, characterized in that the cooling is controlled as a function of said temperature of the gas measured at the outlet of the bypass line.

8. A process as claimed in claim 5, characterized in that the cooling is controlled as a function of at least one of the temperature of the gas measured at the engine outlet, the flow of gas, and the engine torque.

9. A process as claimed in claim 5, characterized in that hydrocarbons are injected upstream from the catalytic conversion and said injection is controlled as a function of the temperature of the gas at the outlet of the bypass line.

10. A process as claimed in claim 5, wherein said internal combustion engine is a diesel or lean-burn spark-ignition engine.

11. In a diesel or lean-burn spark-ignition engine, the improvement comprising an assembly for elimination of nitrogen oxides present in the exhaust gas of an internal-combustion engine, said assembly being part of an exhaust line coming from the engine and comprising:

a nitrogen oxides conversion means, a heat exchanger for cooling said exhaust gas placed in a bypass line, said bypass line having an outlet into said exhaust line situated upstream from said conversion means and an inlet from said exhaust line upstream from said outlet, characterized in that said conversion means comprises several catalysts placed in said exhaust line, said catalysts having non-coinciding temperature ranges for which nitrogen oxides conversion is below a certain threshold ($C_{min}$), and in that at least one valve is placed at the inlet of said bypass line in order to modulate the flow of gas between said bypass line and exhaust line, so that said exhaust gas reaches said catalysts at a temperature where at least one of said catalysts is active.

* * * * *